United States Patent
Martin, Jr. et al.

(10) Patent No.: US 7,509,325 B2
(45) Date of Patent: Mar. 24, 2009

(54) SYNCHRONIZATION OF CONFIGURATION VALUES BETWEEN A DATA BASE AND ITS INPUT UTILITY

(75) Inventors: James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/414,046

(22) Filed: Apr. 27, 2006

(65) Prior Publication Data

US 2007/0255762 A1    Nov. 1, 2007

(51) Int. Cl.
G06F 7/00 (2006.01)
G06F 17/30 (2006.01)
G06F 15/173 (2006.01)
G06F 15/177 (2006.01)

(52) U.S. Cl. .............. 707/10; 707/104.1; 709/223; 715/735

(58) Field of Classification Search ............ None
See application file for complete search history.

(56) References Cited

U.S. PATENT DOCUMENTS

| | | | |
|---|---|---|---|
| 6,029,196 A * | 2/2000 | Lenz | 709/221 |
| 6,308,205 B1 * | 10/2001 | Carcerano et al. | 709/221 |
| 6,704,737 B1 * | 3/2004 | Nixon et al. | 707/101 |
| 6,789,103 B1 * | 9/2004 | Kim et al. | 709/203 |
| 2002/0049744 A1 * | 4/2002 | Nakos et al. | 707/1 |
| 2003/0033398 A1 * | 2/2003 | Carlson et al. | 709/223 |
| 2005/0066155 A1 * | 3/2005 | Dutt et al. | 713/1 |

* cited by examiner

Primary Examiner—Kuen S Lu
Assistant Examiner—Vei-Chung Liang
(74) Attorney, Agent, or Firm—Shelley M. Beckstrand; John Pivnichny

(57) ABSTRACT

A system, method, and computer program product are provided for synchronizing configuration values between a database and a remote input utility by configuring the database for remote input and loading the configuration values to a control file at the server, and copying the configuration values to a control file at remote system including the input utility, executing the input utility at a remote system using configuration values from the control file at the remote system to prepare data for input to the database, and responsive to the configuration values at the control file of the server, updating the configuration values in the control file at the remote system before migrating the new data from the input utility to the database.

4 Claims, 4 Drawing Sheets

SYNCHRONIZATION OF CONFIGURATION VALUES BETWEEN A DATA BASE AND ITS INPUT UTILITY

CROSS REFERENCES TO RELATED APPLICATIONS

U.S. patent application Ser. No. 11/244,921, filed 6 Oct. 2005, entitled "SYSTEM AND METHOD FOR SYNCHRONIZING LANGUAGES AND DATA ELEMENTS", is assigned to the same assignee hereof and contains subject matter related, in certain respect, to the subject matter of the present application. The above-identified patent applications is incorporated herein by reference.

BACKGROUND OF THE INVENTION

1. Technical Field of the Invention

This invention relates to computer programming. More particularly, it relates to the synchronization of configuration values between a data base its input utility.

2. Background Art

With many large database applications there are utilities that are used to supply data to populate the database. When these utilities are run in a way that does not let them communicate directly with the database, it is difficult to have configuration values be kept up-to-date in the utility.

SUMMARY OF THE INVENTION

A system, method, and computer program product are provided for synchronizing configuration values between a database and a remote input utility by configuring the database for remote input and loading the configuration values to a control file at the server, and copying the configuration values to a control file at remote system including the input utility, executing the input utility at a remote system using configuration values from the control file at the remote system to prepare data for input to the database, and responsive to the configuration values at the control file of the server, updating the configuration values in the control file at the remote system before migrating the new data from the input utility to the database.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

In accordance with the preferred embodiment of the invention, updates to configuration information for the database are made immediately available for use by the utility by way of the control INI file of the database.

Figure 1:
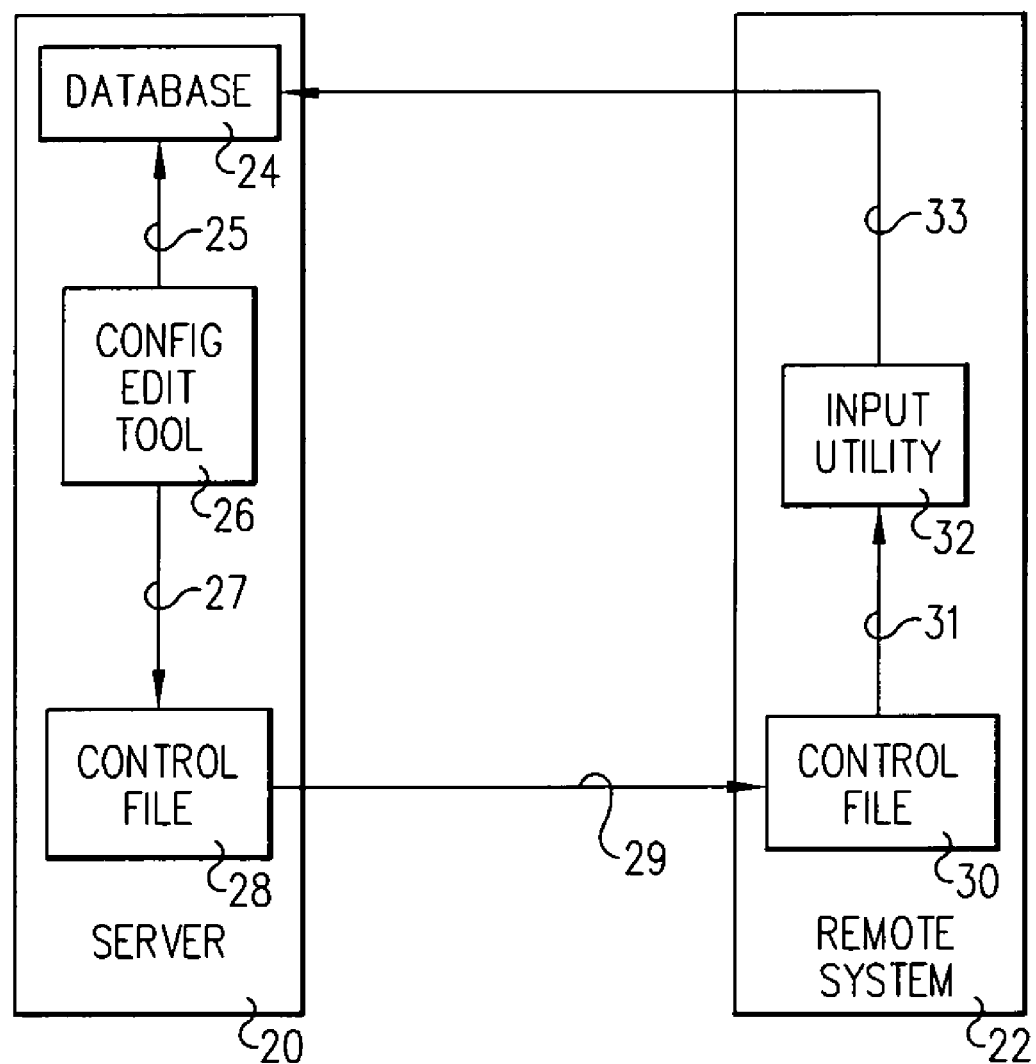
FIG. 1 is a high level system diagram illustrating the preferred embodiment of the invention for synchronizing configuration values between a database and a remote input utility.

Referring to FIG. 1, an exemplary embodiment of the invention includes a server 20 and a remote system 22. Server 20 includes database 24, a configuration edit tool 26, and a control file 28. Remote system includes a control file 30 and an input utility 32.

Database 24 is configured for remote entry. That is, database 24 has an import facility 38 (FIG. 3) that takes the output file from the remote user entry and updates or adds data. The entries in the output file are defined in the control file and thus in the language of the database.

Control file 28 is an INI configuration file containing configuration value.

Control file 30 is also an INI configuration file containing configuration values, the latest of which values are downloaded from the control file 28 at server 20. Configuration values in the INI file are those values in the [NLS] section and in the [Special Needs] section. Values in the [NLS] section of control file 30 for an exemplary computer hardware inventory application, such as an Ethernet Migration Manager (EMM), are set forth in Table 1.

TABLE 1

| [NLS] SECTION OF CONFIGURATION FILE | |
|---|---|
| Yes | The value returned whenever a Yes response is needed. |
| No | The value returned whenever a No response is needed. |
| BlockedPort | The value returned as the port ID when it is blocked and the inventory personnel can not read it. |
| UnknownSerial | The value returned as the MachineSerial if it is not known at the time the inventory was taken. |
| UnknownOwner | The value returned in the OwnerSerial if the owner is not known at the time the inventory was taken. |
| StaticPrinterJustification | The justification that will be given to all network printers. |
| IBM | The name of IBM to be used to check for an IBM manufacturer. |
| CC | The country code, used for blue pages look up (blue pages provide a personnel directory). |
| AdapterDelivered | The text string that is used to indicate that a card was delivered for self install. |
| AdapterNotDelivered | The text string that is used to indicated that a card was required but not delivered for self install. |
| AdapterNotRequired | The text string that is used to indicate that a card is not required for self install. |
| StatusOpen | The status to pass back when the new document is to be in |

TABLE 1-continued

[NLS] SECTION OF CONFIGURATION FILE

| | |
|---|---|
| | the open status in EMM. |
| StatusPending | The status to pass back when the new document is to be in the pending status in EMM. |
| StatusNoMigration | The status to pass back when the new document is to be in the NoMigration status in EMM. |
| StatusComplete | The status to pass back when the new document is to be in the Complete status in EMM. |
| SerialNotInBluePages | The incomplete reason that is automatically chosen if the user's serial number is not found in Blue Pages. |
| MachineNotAvailable | The incomplete reason that is passed back when the employee/machine is not available. |

Figure 2:
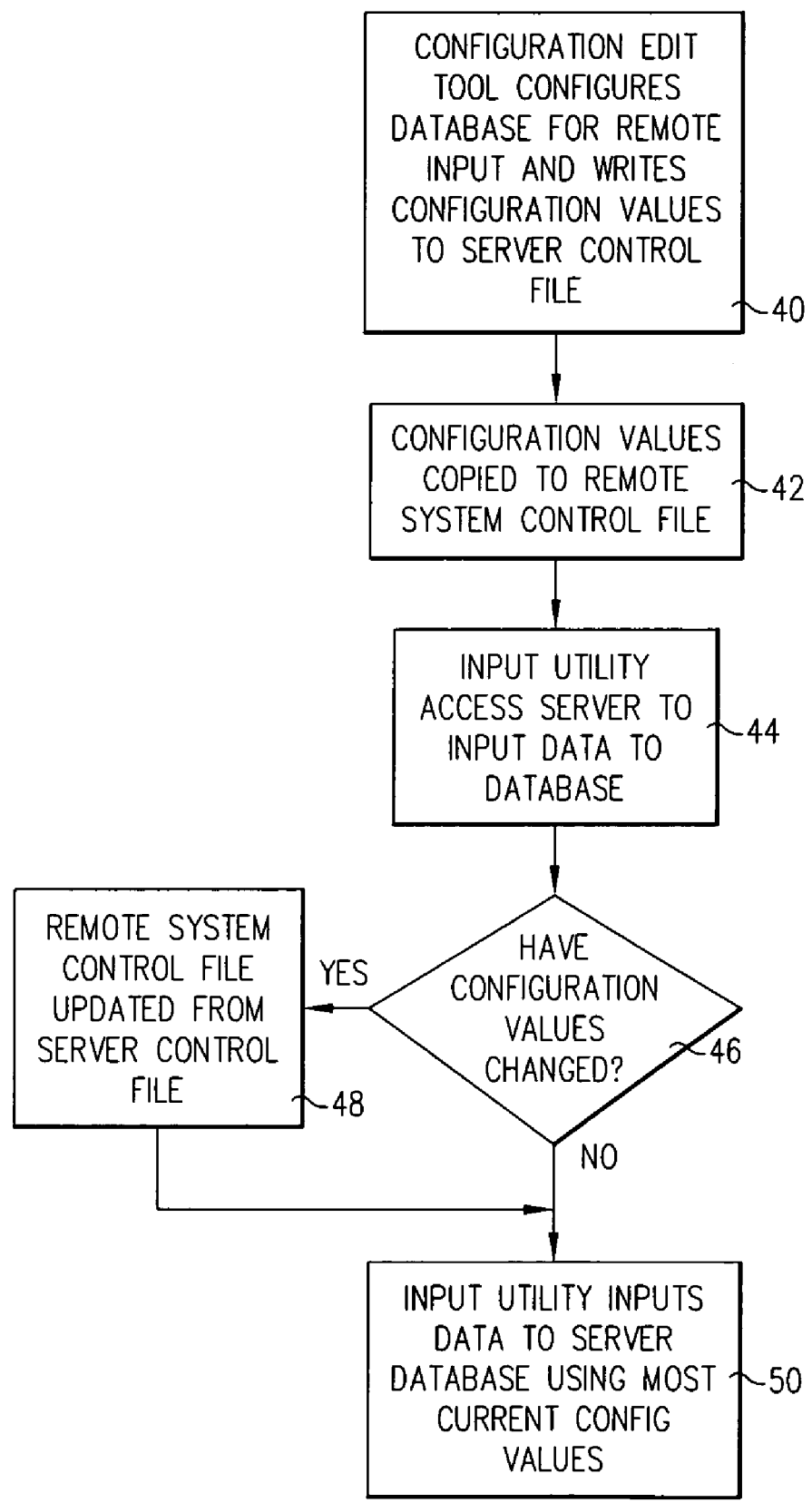
FIG. 2 is a flow chart representation of the preferred embodiment of the invention.

Referring to FIG. 2, in step 40, as is represented by lines 25 and 27, configuration edit tool 26 is used to configure database 24 for remote input, updating configuration values in database 24 and writing them to control file 28. Thereafter, configuration edit tool 26 may be used to change selected configuration values pertinent to remote input, again updating configuration values in database 24 and in control file 28. In step 42, as is represented by line 29, configuration values from control file 28 are copied to control file 30.

In step 44, as is represented by line 33, input utility 32 executes to access server 20 to input data to database 24 using configuration values from control file 30. In step 46, it is determined if configuration values in control value 28 have changed with respect to those in control file 30 and, if so, as is represented again by line 29, in step 48 the configuration values in control file 30 are updated to those from control file 28. In step 50, input utility 32 writes data to database 24 using the most current configuration values obtained, as is represented by line 31, from control file 30. Thus, whenever input utility 32 reads configuration values from control file 30 for use during remote access to database 24, it receives the latest configuration values recorded to control file 28 by configuration edit tool 26.

In accordance with further embodiments of the invention, input utility 32 may execute on a remote system 22, such as a workstation in an office, possibly when system 22 is not connected server 20. In this instance, input utility would save the data at remote system 22 using, as is represented by line 31, the latest configuration values from control file 30, those values having been updated to those present in control file 28 at that last connect time between server 20 and remote system 22. If, at a subsequent time, that data is to be uploaded to server 20, the configuration values in control file 30 would be updated to those of control file 28, and the data uploaded using the more current configuration values.

Data entered using obsolete configuration values from control file 30 may be converted for uploading to database 24 with current configuration values. If the server containing the updated control file is accessible then the configuration will be updated. If the server is not available then the user is prompted to use the older configuration, and the values defined there are what will be sent to the database.

Figure 3:
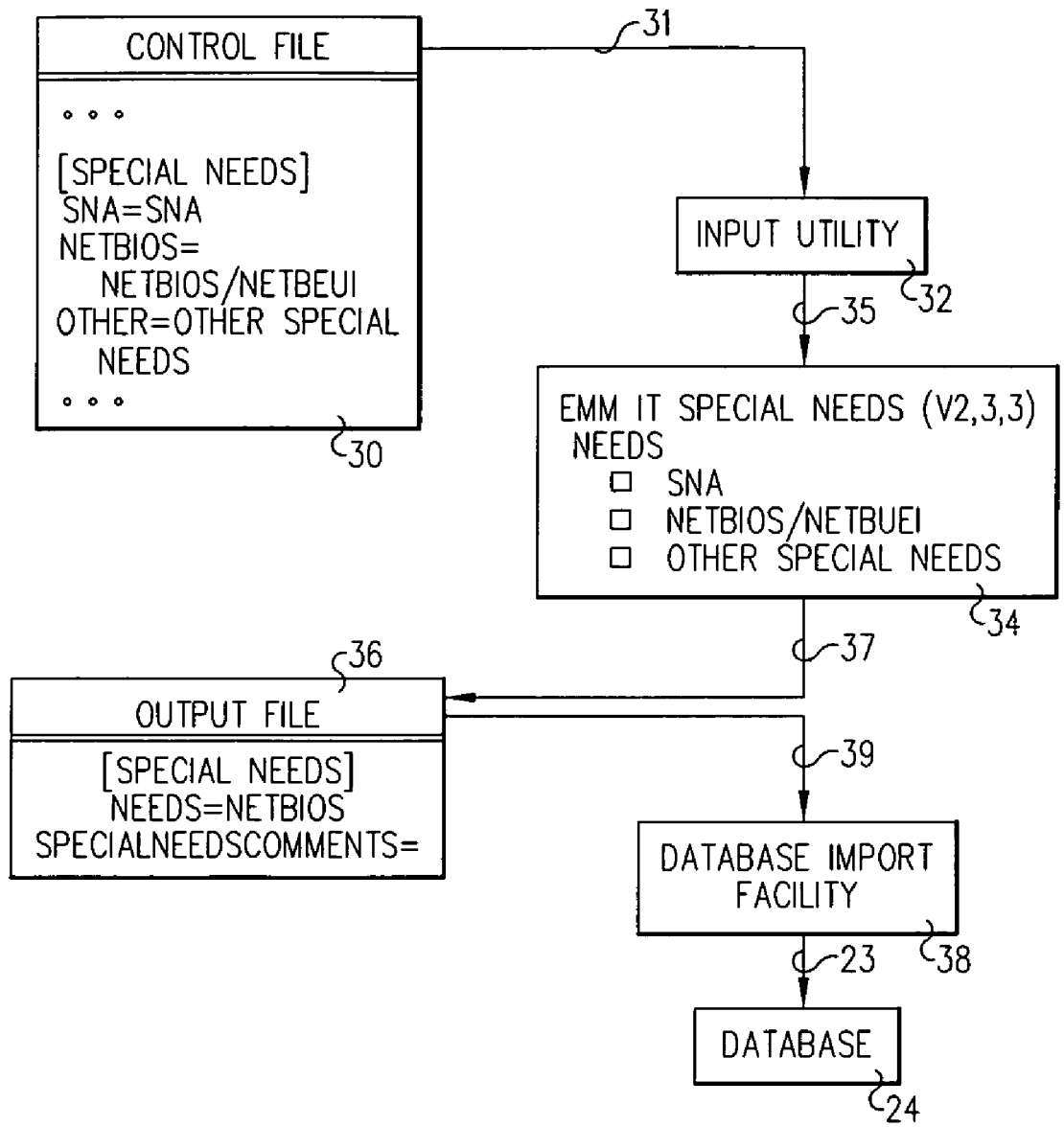
FIG. 3 illustrates a user interface showing data migration instructions from configuration values for presentation to a user.

Referring to FIG. 3, input utility 32 is configured by configuration parameters in control file 30 to present as is represented by line 35 at a user interface 34 instructions by, for example, lists or drop down menus defined in database 24 and presented to the user via control files 28 and 30 on how migration of data from remote system 22 to server 20 is to occur—that is, which data to enter. In this mode, input utility 32 is a standalone executable that uses control file 30 to obtain the most current configuration values.

By way of example, control file 30 may include a section comprising the following instructions:
[Special Needs]
SNA=SNA
NetBIOS=NetBIOS/NetBEUI
Other=Other special needs These instructions prompt the user with dialog 34, resulting in the following being placed in output file 36, as is represented by line 37:
[Special Needs]
Needs=NetBIOS
SpecialNeedsComments=

Database 24 has an import facility 38 that takes as is represented by lines 39 and 23 the output file 36 from the remote user entry and updates or adds data to database 24. The entries in the output file 36 are as defined in control file 30, and thus in the language of the database 24.

In a further exemplary embodiment a drop down menu may be used for language support. In the example of FIG. 3, a database shows at user interface 34 a checklist giving choices as SNA, NetBIOS and Other. The user knows the choices as SNA, NetBIOS/NetBEUI and Other special needs. When displayed to the user the choices known to the user are presented and when one is chosen it is passed back to the database as the corresponding choice as the data base knows it. This list could be displayed as a drop down instead of a check list if only one choice is allowed.

Advantages over the Prior Art

It is an advantage of the present invention that there is provided a system, method, and computer program product for synchronizing configuration values between a data base its input utility.

Alternative Embodiments

The invention can take the form of an entirely hardware embodiment, an entirely software embodiment or an embodiment containing both hardware and software elements. In a preferred embodiment, the invention is implemented in software, which includes but is not limited to firmware, resident software, and microcode.

Figure 4:
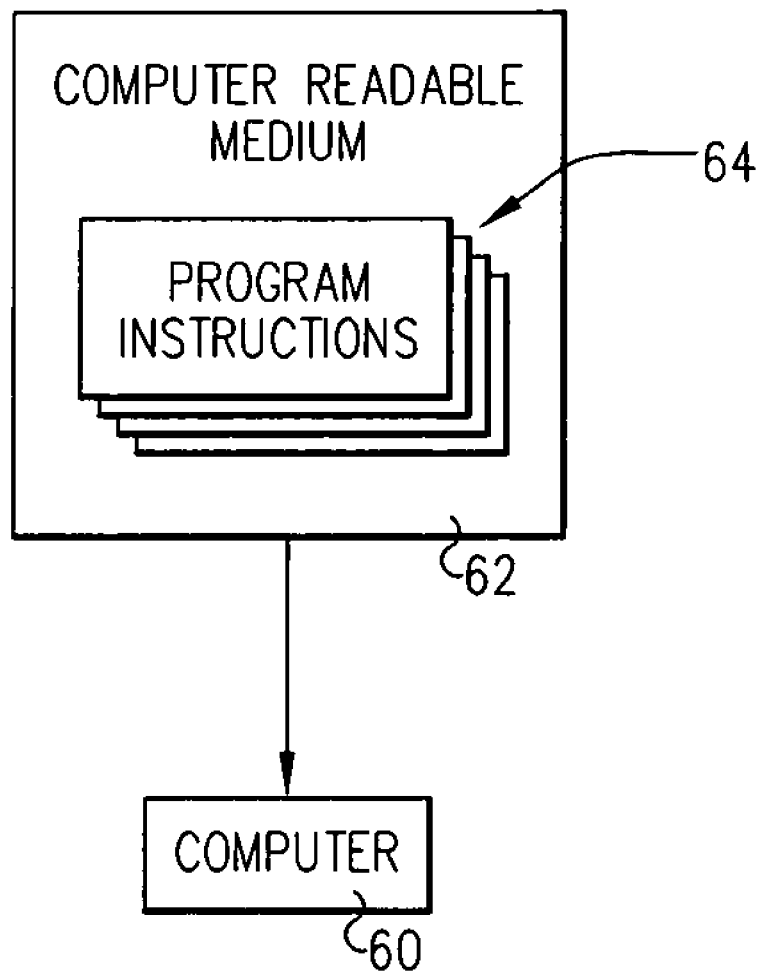
FIG. 4 is a high level system diagram illustrating a program storage device readable by a machine, tangibly embodying a program of instructions executable by a machine to perform method steps for synchronizing configuration values between a database and a remote input utility.

Furthermore, referring to FIG. 4, the invention can take the form of a computer program product accessible from a computer-usable or computer-readable medium 62 providing program code 64 for use by or in connection with a computer 60 or any instruction execution system. For the purposes of this description, a computer-usable or computer-readable medium can be any apparatus that can contain, store, communicate, propagate, or transport the program for use by or in connection with the instruction execution, system, apparatus, or device.

The medium 64 can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor 60 coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be appreciated that, although specific and alternative embodiments of the invention have been described herein for purposes of illustration, various further modifications may be made without departing from the spirit and scope of the invention. Accordingly, the scope of protection of this invention is limited only by the following claims and their equivalents.

We claim:

1. A method for synchronizing configuration values between a database and a remote input utility for a computer hardware inventory application, comprising:

configuring said database at a server for input from said input utility at said remote system;

loading configuration values to a control file at said server, said configuration values including yes, no, blocked port, unknown serial, unknown owner, adapter delivered, adapter not delivered, adapter not required, status open, status pending, status no migration, status complete, serial not in directory, machine not available, and a special needs section comprising a plurality of entries defining special needs for a workstation configuration of the form indicia A=indicia B;

where yes is a value returned whenever a yes response is needed, no is a value returned whenever a no response is needed, blocked is a value returned as a port identifier when said port is blocked and inventory personnel can not read it, unknown serial is a value returned as machine serial if said machine serial is not known at the time of executing said inventory application, unknown owner is a value returned if an owner is not known at the time of executing said inventory application, adapter delivered is a text string used to indicate that a card has been delivered for installation by a user, adapter not delivered is a text string used to indicate that a card is required but not delivered for installation by said user, adapter not required is a text string used to indicate that a card is not required for installation by said user, status open is a value returned when a new document is to be in open status in said inventory application, status pending is a value returned when a new document is to be in pending status in said inventory application, status no migration is a value returned when a new document is to be in no migration status in said inventory application, status complete is a value to be returned when a new document is to be in complete status in said inventory application, serial not in directory is a value returned when said user's identifier is not found in a directory of users, and machine not available is a value returned when an employee machine is not available;

copying said configuration values to a control file at said remote system;

executing said input utility using configuration values from said control file at said remote system to prepare and load to an output file configuration data for input to said database, indicia B represents dialog text presented to a user for prompting a response and indicia A represents corresponding text provided to said output file thereby presenting to said user as indicia B choices as understood by said user and returning to said database indicia A choices as known to said database; and responsive to configuration values at said control file changing with respect to those in said control file at said server, updating configuration values in said control file at said remote system before migrating new data from said input utility to said database.

2. The method of claim 1, said input utility presenting migration instructions to a user at a user interface derived from configuration values in said control file at said remote system.

3. The method of claim 2, said input utility executing while disconnected from said server to prepare new input data using configuration values most recently loaded to said control file at said remote system.

4. The method of claim 3, said utility being responsive to connecting to said server for receiving updated configuration values from said server for updating said new input data to said updated configuration values before migrating said new input data to said database.

* * * * *